United States Patent [19]

Gaus et al.

[11] Patent Number: 5,191,499

[45] Date of Patent: Mar. 2, 1993

[54] METHOD AND APPARATUS FOR CURRENT INTERRUPTION IN ELECTRICALLY-POWERED APPARATUS AND EQUIPMENT

[75] Inventors: Harry Gaus, Dilsberg; Manfred Grove, Dreieich, both of Fed. Rep. of Germany

[73] Assignee: Intermacom A.G., Zurich, Switzerland

[21] Appl. No.: 699,956

[22] Filed: May 14, 1991

[51] Int. Cl.⁵ ............................................. H02H 3/16
[52] U.S. Cl. ........................................ 361/49; 361/104; 361/50; 361/45; 307/326
[58] Field of Search ................. 361/42, 45, 49, 55, 361/104, 106, 120, 123, 129, 124; 338/20, 21, 49, 120

[56] References Cited

U.S. PATENT DOCUMENTS

| | | | |
|---|---|---|---|
| 2,863,021 | 12/1958 | Green | 200/114 |
| 3,407,840 | 10/1968 | Finnegan | 137/392 |
| 3,525,902 | 8/1970 | Davidson et al. | 317/9 |
| 3,535,590 | 10/1970 | Mayer | 317/18 |
| 3,629,766 | 12/1971 | Gould, Jr. | 337/239 |
| 3,728,583 | 4/1973 | Wickson | 317/33 SC |
| 3,770,002 | 11/1973 | Brown | 137/312 |
| 3,875,431 | 4/1975 | Kapp | 307/298 |
| 3,948,143 | 4/1976 | Olsen | 89/1 B |
| 3,997,818 | 12/1976 | Bodkin | 317/33 SC |
| 4,023,072 | 5/1977 | Plasko | 361/103 |
| 4,044,244 | 8/1977 | Foreman et al. | 235/153 AC |
| 4,085,397 | 4/1978 | Yagher, Jr. | 337/407 |
| 4,103,319 | 7/1978 | Crain et al. | 361/106 |
| 4,112,312 | 9/1978 | McGalliard | 307/118 |
| 4,124,835 | 11/1978 | Cahill, Jr. | 337/1 |
| 4,263,576 | 4/1981 | Murata et al. | 338/35 |
| 4,270,158 | 5/1981 | Gilardoni et al. | 361/42 |
| 4,328,387 | 5/1982 | Kemble | 219/517 |
| 4,438,477 | 3/1984 | Cawley | 361/56 |
| 4,464,582 | 8/1984 | Aragaki | 307/118 |
| 4,477,857 | 10/1984 | Crocker | 361/104 |
| 4,484,243 | 11/1984 | Herbst et al. | 361/42 |
| 4,567,456 | 1/1986 | Legatti | 335/20 |
| 4,589,047 | 5/1986 | Gaus et al. | 361/42 |
| 4,685,021 | 8/1987 | Kortschinski | 361/42 |
| 4,709,293 | 11/1987 | Gershen et al. | 361/50 |
| 4,751,603 | 6/1988 | Kwan | 361/42 |
| 4,829,390 | 5/1989 | Simon | 361/49 |
| 4,931,894 | 6/1990 | Legatti | 361/45 |
| 5,019,935 | 5/1991 | Nakamura | 361/45 |

FOREIGN PATENT DOCUMENTS

| | | |
|---|---|---|
| 0001831 | 5/1979 | European Pat. Off. |
| 0088390 | 9/1983 | European Pat. Off. |
| 0218847 | 4/1987 | European Pat. Off. |
| 2220264 | 11/1972 | Fed. Rep. of Germany |
| 3702970 | 8/1988 | Fed. Rep. of Germany |
| 3826462 | 2/1990 | Fed. Rep. of Germany |
| 8700226 | 11/1987 | PCT Int'l Appl. |

Primary Examiner—Todd E. DeBoer
Attorney, Agent, or Firm—Kenyon & Kenyon

[57] ABSTRACT

A device and method for interrupting current flow to an electrically-powered apparatus is disclosed. The device includes a means for detecting a selected value of a physical parameter associated with the operation of the externally powered electrical apparatus, a trigger circuit incorporating an integrated circuit, a firing device which responds to the trigger circuit by generating a conductive plasma, an electronic measurement circuit to prevent unwanted firing of the firing device and thin conductors which are destroyed by the firing device when the conductive plasma forms an electric arc between them. Current flow to the electrically-powered apparatus is thereby terminated.

30 Claims, 5 Drawing Sheets

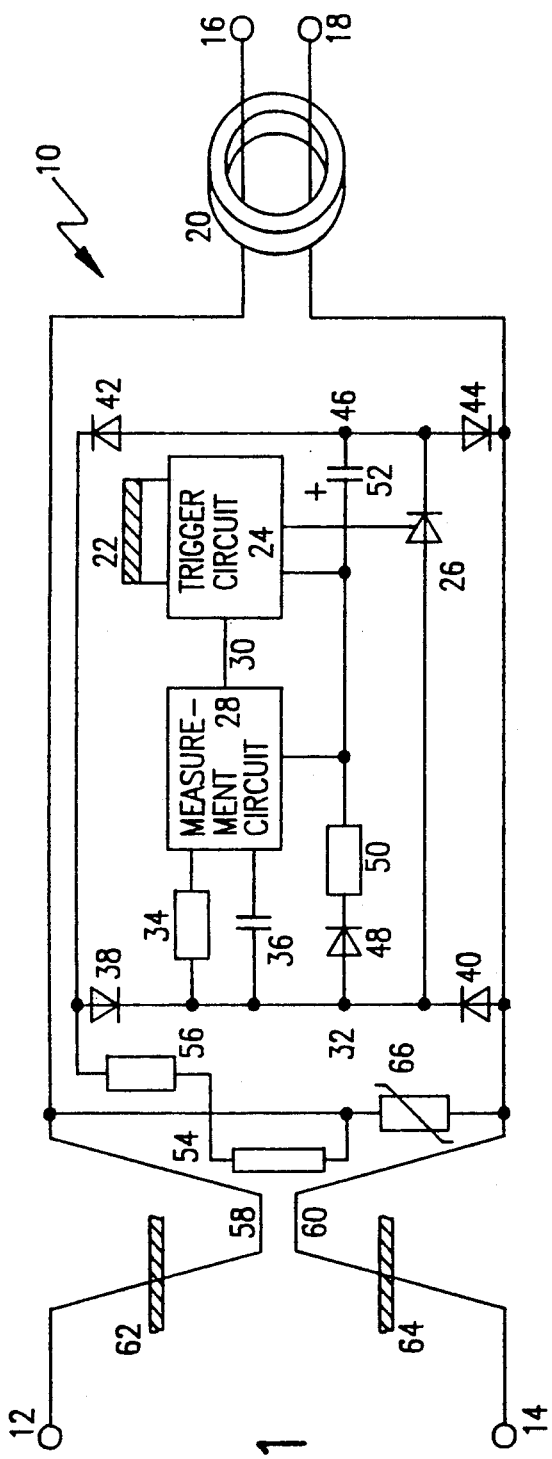
FIG. 1
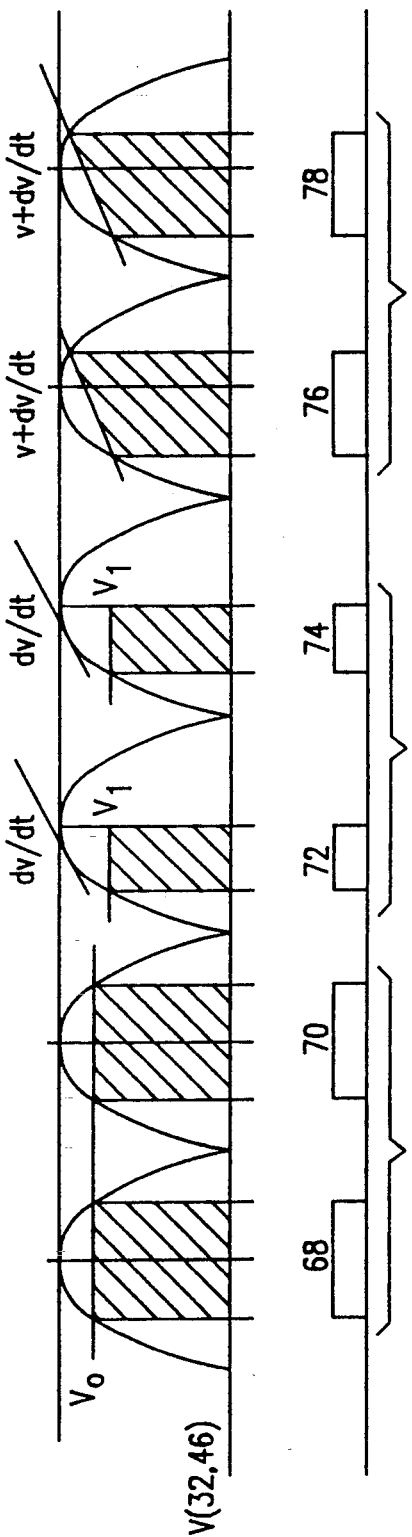
FIG. 2a
FIG. 2b
FIG. 2c

METHOD AND APPARATUS FOR CURRENT INTERRUPTION IN ELECTRICALLY-POWERED APPARATUS AND EQUIPMENT

FIELD OF THE INVENTION

The present invention relates to a current-interruption device for electrically-powered apparatus to prevent accidental electrocution of a user through the rapid disconnection (less than about 20 mS) of the electrical connection. Such a device is especially suitable for portable equipment powered by a power line through a power cord connection.

BACKGROUND OF THE INVENTION

Electrical fuses and circuit interrupters have been used to disconnect electrical power supplies when overcurrent and/or overvoltage situations occur. Even the most accurate fuses and circuit interrupters require a substantial response time (i.e. 10 seconds to 100 seconds at twice the current limit) between the time the malfunction is detected and the time the electrical supply is switched off. Sensitive electrical and electronic components currently require a much faster response time to be adequately protected. Other types of equipment must also be quickly shutdown in response to detection of physical parameters, such as pressure, temperature, speed etc., when those parameters exceed a predetermined level.

In addition, people with heart problems are not able to withstand a current flow of 6 to 300 mA during the response time of currently available current interruption devices. During the response time, the current flow may increase to some multiple of the threshold detection current. However, people with heart problems will be harmed if exposed to ground fault current for more than 20 ms. In such a circumstance, a car pacemaker may malfunction and cause ventricular fibrillation.

There have been many attempts in the prior art to produce a device which will prevent accidental electrocution. These devices work in a number of ways. Some operate by quickly detecting and reacting to a resultant overload. Others react to a short between a supply conductor and an external ground. Another type of device detects a short occurring in the load where a person may be connected between the shorted load and the ground. Finally, there have also been many attempts to provide overload and/or over-voltage protection for circuits.

There are two types of existing devices of particular interest in relation to the present invention. First, there is the Immersion Detection Circuit Interrupter ("IDCI"). Second, there is the Ground Fault Circuit Interrupter ("GFCI"). Both of these devices can be physically located in either the power outlet, in the plug, or in the apparatus itself.

A modification of the GFCI type device is described in applicant's co-pending U.S. patent application Ser. No. 07/621,342, the text of which is incorporated herein by reference.

The types of devices described above (i.e. IDCI, GFCI, and the modified GFCI) typically utilize mechanical circuit interrupters, switches, or other contacts in order to disconnect the power supply from the apparatus. These mechanical-type devices suffer from the disadvantage of a high failure rate due to sticking or jamming of the movable parts comprising the device. In addition, these mechanical type switches are expensive in terms of both material and assembly costs.

Electronic-type switches such as described in U.S. Pat. No. 3,997,818 have also been previously utilized. These types of switches are also high in cost. In addition, these switches suffer from the disadvantage of generating a large amount of waste heat in the switch components during normal operation. In appliances requiring a high load current flow, such as a hair dryer, the waste heat generated by the switch can be excessive. These electronic circuit interrupters also suffer from the disadvantage of being susceptible to transinter alloy formation. Transinter alloy formation occurs when two alloys comprising different parts of the switch diffuse into each other. When this phenomenon occurs, the switch will no longer be able to perform its function of shutting off power to the apparatus since the switch will be permanently closed.

Another type of circuit interruption device which has been previously utilized combines conductive material in combination with explosives. Such devices are described in U.S. Pat. No. 3,728,583 and PCT/EP/00226. A typical device of this sort includes a capacitor which discharges to a thin wire. Upon discharge of the capacitor, the thin wire evaporates instantaneously and causes an explosion which destroys a conductive connector. Destruction of the conductive connector causes the power to the electrical apparatus to be terminated. This type of device requires components which are both responsive to electrical signals and also destructible. This type of device is complicated to design since the remnants of the destroyed components need to be contained to prevent shorts or electrical connections after the safety switch has been triggered. This complicated design may render these types of switches even more costly to assemble than the mechanical switches described above.

OBJECTS AND SUMMARY OF THE INVENTION

An object of the present invention is to provide a protective device for electrically powered apparatus and equipment which overcomes the disadvantages of existing safety devices.

The present invention provides a current interruption device for an externally powered electrical apparatus. The current interruption device includes a means for detecting a selected value of a physical parameter associated with the operation of the electrical apparatus, a fuse means electrically connected to non-ground electrical conductors and to electrical power input conductors, a trigger means electrically connected to the detection means and the fuse means including means for generating a plasma in response to the detection of the selected value of the physical parameter so that the plasma destroys the fuse means and interrupts current flow to the apparatus, and an electric measurement means to prevent destruction of the fuse means unless the power supply voltage exceeds a selected voltage.

BRIEF DESCRIPTION OF THE DRAWINGS

FIG. 1 is a schematic drawing of a typical electronic circuit embodying the present invention.

FIG. 2 a–c is a plot of voltage against time illustrating the conditions under which the electronic circuit illustrated in FIG. 1 can operate.

DETAILED DESCRIPTION OF THE INVENTION

Figure 3:
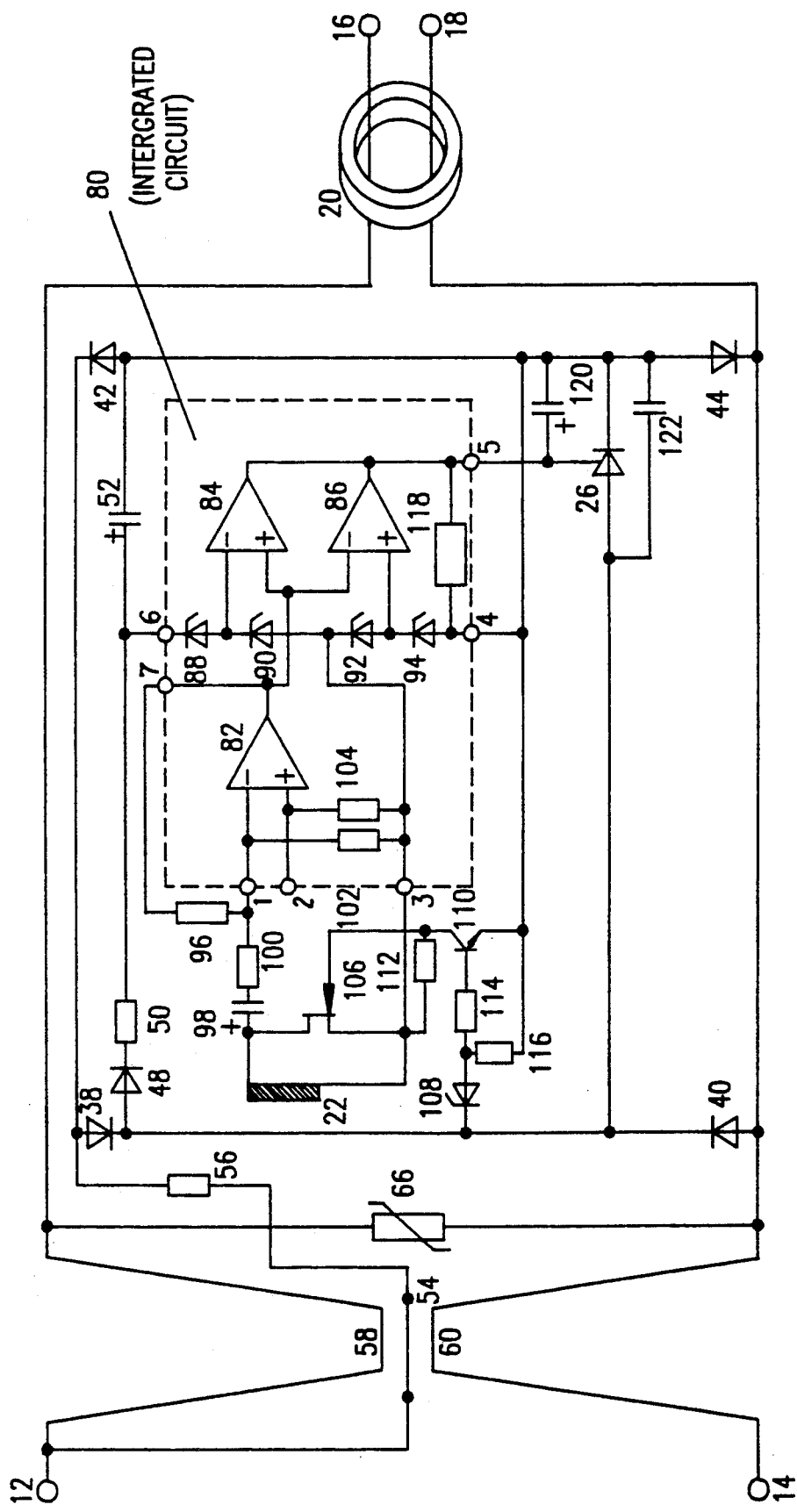
FIG. 3 is a functional layout of the electronic circuit illustrated in FIG. 1.

FIG. 1 is a schematic diagram of a typical circuit 10 embodying the current interruption device of the present invention. Power is supplied to the electrically powered apparatus (not shown) through the circuit 10. Plug pins 12, 14 are connected to destructible conductors 58 and 60 on a printed circuit board ("PCB") 144 (see FIG. 4). Conductors 16, 18 supply power to the electrically-powered apparatus.

Conductors 16, 18 pass through a hollow core transformer 20. The transformer 20 may be a TRC standard coil 1000:1 type. Transformer 20 includes a sensor coil 22 which can detect a differential current between conductors 16, 18. A differential current is indicative of a "hot" wire being connected to ground (e.g., through a conductive liquid such as water).

When a differential current exceeds a selected level, the sensor coil 22 signals the trigger circuit 24. The trigger circuit 24 is described in more detail below. Upon detection of the selected differential current, the trigger circuit 24 can cause the silicon-controlled rectifier ("SCR") 26 to "fire". SCR 26 may be a model No. MRC 100-8 manufactured by Motorola. As described in more detail below, firing of SCR 26 causes current to flow across "fire" resistor 54.

The circuit also includes an electric measurement circuit 28. The electric measurement circuit 28 can prevent, via line 30, the SCR 26 from firing if the proper firing conditions have not occurred at a selected point 32. The proper conditions for firing are determined by considering the power supply voltage across resistor 34 and the voltage increase dv/dt across a capacitor 36.

The voltage at point 32, in comparison to the voltage at point 46, will appear rectified in comparison to the voltage at 46 as a result of the action of diodes 38, 40, 42 and 44. Diodes 38, 40, 42 and 44 are all type 1N 4004. Direct current (DC) is supplied to the trigger circuit 24 and measurement circuit 28 by diode 48 (1N 4004) and resistor 50 (22 kohms, 2 watts, ±5%).

Capacitor 52 (tantalum type 1 MF/35 V-) is charged for a short time (approximately one-half wavelength) when SCR 26 is fired. During the time SCR 26 is fired, the voltage between points 32 and 46 collapses. Diode 48 prevents capacitor 52 from discharging.

A current flows across "fire" resistor 54 when SCR 26 is fired. This current flow must be such that SCR 26 can withstand the current for approximately 10 milliseconds without being destroyed. Resistor 56 (20 ohm, 2 W ±5%) will limit the current flow through SCR 26 after fire resistor 54 is burned off and an electrical arc (which always has a negative resistance) is formed between its connectors. Resistor 56 is preferably of the wire-wound type.

Fire resistor 54 may be fabricated from a thin, resistive wire of approximately 0.05 mm diameter. If a 20 ohm resistor is used as resistor 56, the resistor 54 will initiate generation of a conductive gas referred to hereinafter as a "plasma" within approximately 0.5 milliseconds. Suitable alloys for resistor 54 include those with a high specific resistance such as CuNi44, Constantan or Isotan available from Isabellanhutte, Dillenburg, Germany. However, the present invention is not limited to such an embodiment and those skilled in the art will appreciate that other types of resistors may be operable.

Figure 4:
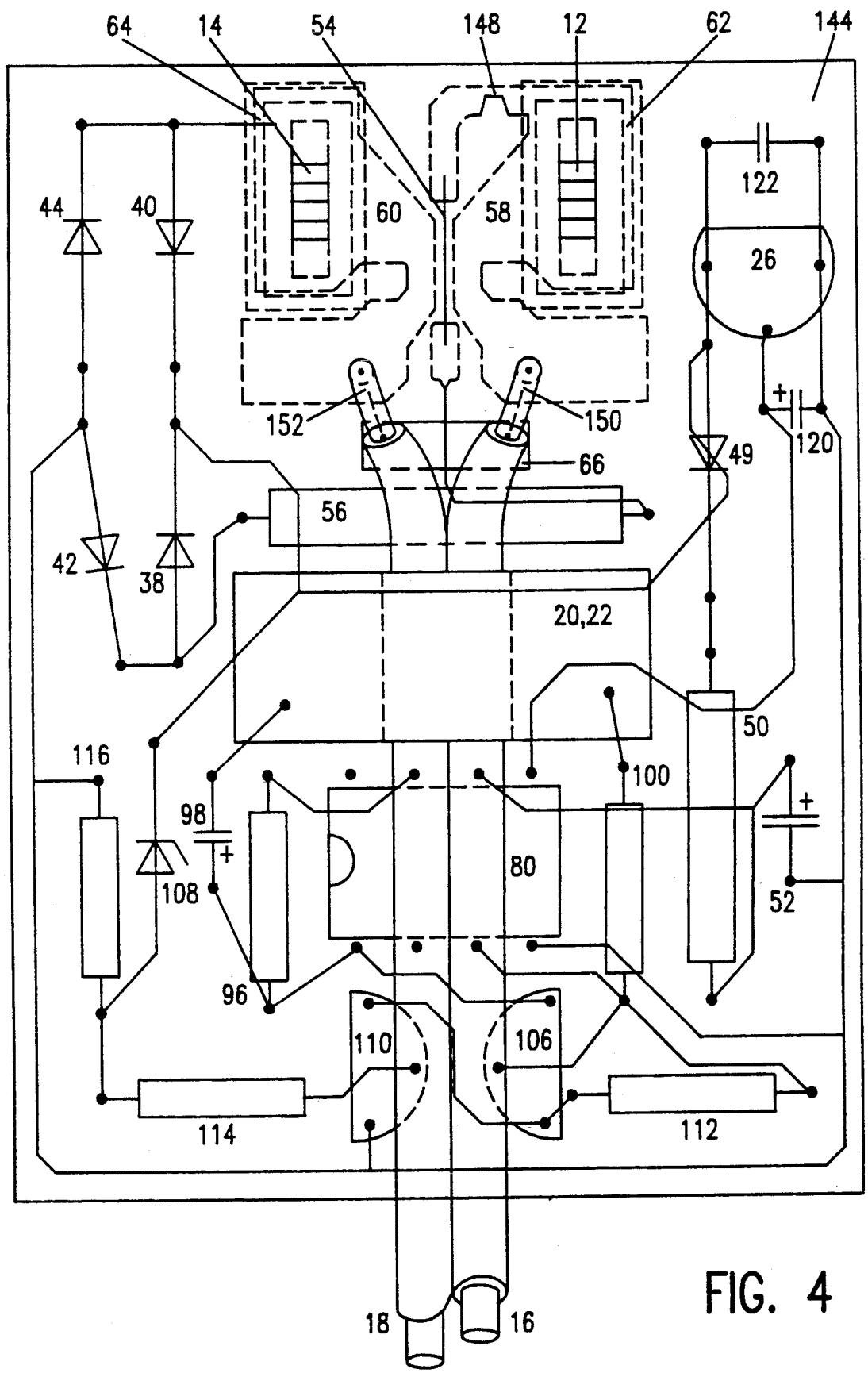
FIG. 4 is a mechanical layout of a printed circuit board containing the electronic circuitry illustrated in FIG. 3.

The fire resistor 54 is physically located as close as possible to the destructible conductors 58 and 60. As illustrated in FIG. 4, fire resistor 54 is located between destructible conductors 58 and 60. Destructible conductors 58 and 60 are copper lines formed on a surface of PCB 144. In order to operate with a 13 amp load, destructible conductors 58 and 60 may be fabricated from 20 micron copper sheet. Conductors 58 and 60 are located as close to each other as possible on the PCB 144. The PCB 144 may be fabricated from prepreg according to UL 94-Vo for printed circuit boards type CEM 1 per NEMA-LII. As illustrated in FIG. 4, the distance between 58 and 60 and their respective thicknesses increase as they approach conductors 12 and 14.

After SCR 26 fires, and current flows through resistor 54, resistor 54 becomes heated and partially evaporates. The partial evaporation of resistor 54 causes the generation of the plasma. Fire resistor 54 still maintains a current flow while the plasma is generating.

The plasma generated by fire resistor 54 reaches the destructible conductors 58 and 60 which are adjacent thereto. Destructible conductors 58 and 60 serve as a type of fuse means. The plasma serves as a bridge that forms an electric arc between destructible conductors 58 and 60.

The electric arc is limited by the impedance of the power supply grid. The electric arc causes the thin destructible conductors 58 and 60 to evaporate/burn off the PCB at a location adjacent to fire resistor 54. The evaporation of 58 and 60 will continue until it reaches barriers 62 and 64 respectively. At that point, the arc extinguishes due to lack of further conductive material and current flow to the externally powered electrical apparatus is terminated.

The destructible conductors 58 and 60 are sized such that the burn off process will be completed within approximately 8.3 to 10 milliseconds which corresponds to one-half cycle of the AC current. Therefore, the integral of the current, $i^2 \times t$, remains considerably below the integral of the current (16 to 20 amps) required to trigger a fuse in the power supply grid.

The circuit also includes a metal oxide varistor ("MOV") 66 (manufactured by General Electric) for absorbing any voltage spikes caused by the power supply grid. Thereby, unwanted firing and the consequent electric arc formation are avoided MOV 66 may be a 6 joule 150 V varistor.

The conditions under which electric measurement circuit 28 can operate are illustrated in FIG. 2. The vertical axis in FIG. 2 represents the voltage between points 32 and 46 ("power supply voltage") while the horizontal axis represents elapsed time.

Fire resistor 54 must be protected against accidental triggering during the neutral phase of the AC cycle. During the neutral phase, electric measurement circuit 28 prevents the fire resistor 54 from forming the plasma and the consequent electric arc required to burn off destructible conductors 58 and 60.

FIG. 2a illustrates one possible condition in which electric measurement circuit 28 will allow trigger circuit 24 to fire. When the power supply voltage exceeds a selected voltage, Vo, electric measurement circuit 28 will allow trigger circuit 24 to fire. Referring to FIG. 2a, the time windows 68 and 70 represent the time increments during which trigger circuit 24 can fire because electric measurement circuit 28 does not allow trigger circuit 24 to fire during time increments when the power supply voltage is less than Vo.

Since fire resistor 54 requires a finite time period to initiate formation of the plasma, the response time of the device may be shortened if the firing time window is advanced by this finite time period. FIG. 2b illustrates this firing condition. The selected threshold power supply voltage V1 must be positive as must dv/dt. In this case, the time windows for firing, 72 and 74 are advanced relative to time windows 68 and 70. However, time windows 72 and 74 are of shorter duration than time windows 68 and 70.

FIG. 2c illustrates a third condition for which electric measurement circuit 28 allows trigger circuit 24 to fire. In this case, the power supply voltage is added to the voltage increase dv/dt and compared to the selected threshold voltage. Time windows 76 and 78 are available during which trigger circuit 24 may fire. Time windows 76 and 78 are advanced relative to the sine function of the power supply voltage.

A functional layout of the current-interruption device is illustrated in FIG. 3. The circuitry of the current-interruption device incorporates an integrated circuit 80. A typical integrated circuit for use in this device is a Raytheon Model RV4145. The internal circuitry of the integrated circuit 80 is illustrated by the dotted line in FIG. 3. The internal circuitry is explained below.

The selected differential current is detected by the sensor coil 22 in the differential transformer 20. The differential current is amplified by Op-amp 82 and its output voltage is compared with selected voltage levels by comparators 84 and 86. These internal selected voltage levels of the IC 80 are determined by diodes 88, 90, 92 and 94. When the output voltage of Op-Amp 82 exceeds the voltage level of IC 80, the SCR 26 is fired.

Resistor 96 (1 Mohm, ¼ watt, ±2%) controls the amplification/sensitivity of the trigger threshold of the differential voltage. Capacitor 98 (Tantalum, 33 MF/6 V-) prevents a DC offset from occurring in coil 22 of the differential transformer 20. Resistor 100 (100 ohms, ¼ watt, ±5%) dampens the amplitude of the cycling between coil 22 and capacitor 98. Resistors 102 and 104 form the current passage for bias-current of the op-amp 82.

A "Junction-FET" 106 (Type BF 245B) in depletion mode can short coil 22 to prevent unwanted triggering of the safety device. This unwanted triggering may occur during low voltage when a zener diode 108 (120 V, 400 mw) is not conductive and transistor 110 (Type npn - BC 546B) is blocked. During this type of low voltage occurrence, the gate of Junction-FET 106 across resistor 112 (1 Mohm, ¼ watt, ±5%) is on "source-potential" and Junction-FET 106 is conductive (i.e. coil 22 is shorted).

When the power supply voltage is adequate, zener diode 108 is conductive as is transistor 110. The gate of Junction-FET 106 is at approximately 13 volts negative as compared with the source. In this instance, Junction-FET 106 is blocked and coil 22 is functional.

Resistor 114 (47 Kohms, ¼ Watt, ±5%) limits the current flow into transistor 110. Resistor 116 (47 Kohms, ¼ Watt, ±5%) enhances the blockage characteristics of transistor 110. Resistor 118 and capacitors 120 and 122 (Tantalum, 6.8 MF/6 V-) improve the blockage characteristics of SCR 26.

Figure 5:
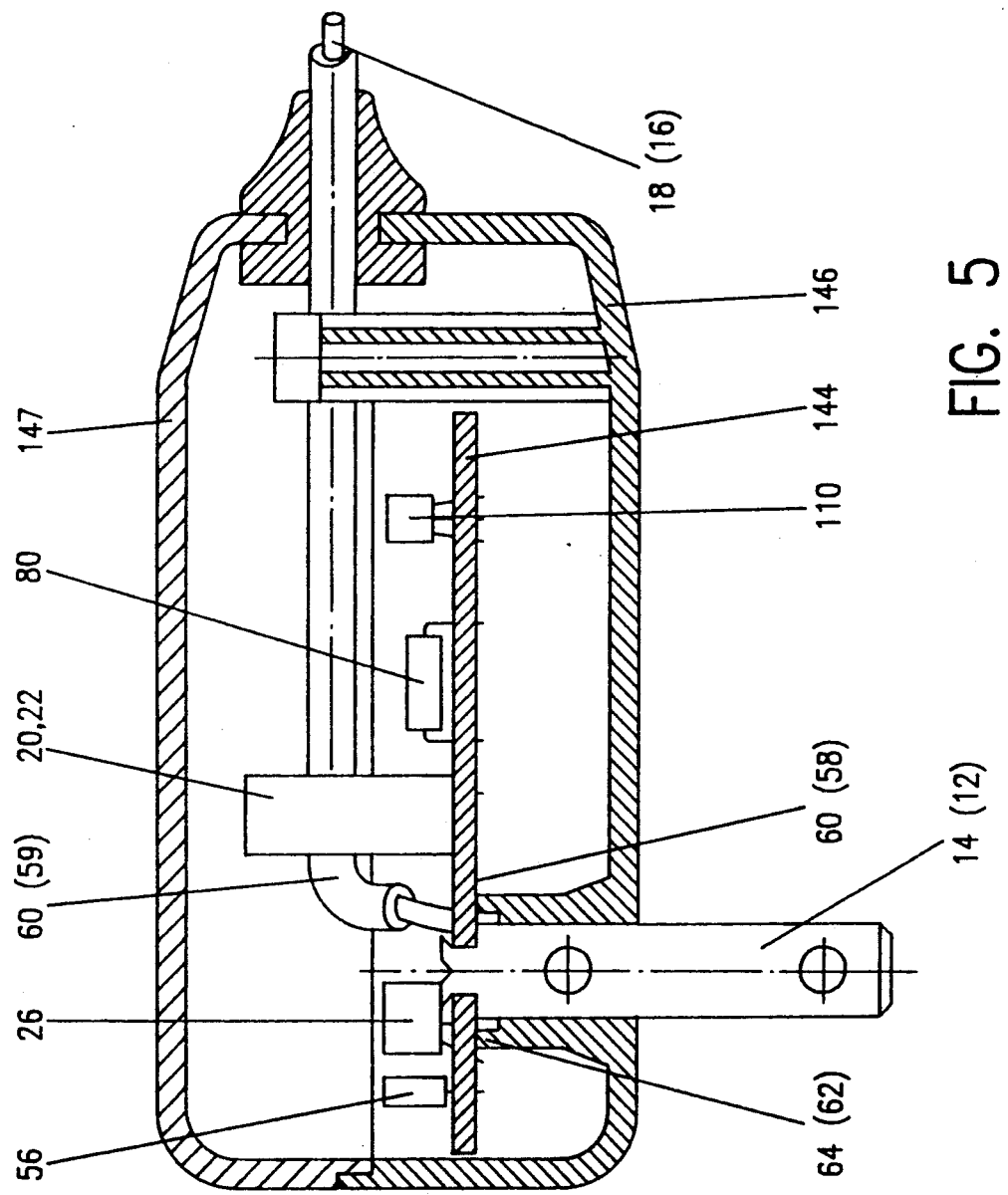
FIG. 5 is a cross-section of an electrical-apparatus input plug containing the printed circuit board illustrated in FIG. 4.

A mechanical layout of a PCB 144 incorporating the circuitry of FIG. 3 is illustrated in FIG. 4. The input power is conveyed through the plug pins 12 and 14 of a plug inserted in a power outlet or by other means. The printed circuit board 144 is inserted into the bottom portion of the plug housing 146 as shown in FIG. 5. The printed circuit board 144 may be riveted to the plug pins 12 and 14.

All of the conductive lines on the PCB 144 including conductors 58 and 60 are formed on the side of the PCB which faces the bottom portion of the plug housing 146. As can be seen in FIG. 4, destructible conductors 58 and 60 are arranged in a sort of v-shape. The electric arc which destroys conductors 58 and 60 starts near the bottom of the v-shape where the destructible conductors 58 and 60 are closest to each other. All of the other components except resistor 54 are mounted on the opposite side of the PCB 144.

Resistor 54 is coated with an insulation layer comprising a polyurethane lacquer which allows soldering. The lacquer is also applied to the PCB 144 in the solder area of resistor 54 between destructible conductors 58 and 60 (see FIG. 4).

Resistor 54 is soldered on one end to conductive layer 148 on the PCB 144. The conductive layer 148 is narrowed so that when the electric arc caused by the plasma is near this area, the layer 148 evaporates immediately and does not interfere with the evaporation of conductors 58 and 60.

The barriers 62 and 64 are formed in the shape of cages as illustrated in FIG. 4. The barriers 62 and 64 are formed as part of the bottom half of the plug housing 146 as illustrated in FIG. 5. Plug pins 12 and 14 pass through the barriers 62 and 64 thereby preventing the electric arc from burning the bulk material between the plug pins 12 and 14.

The ends 150 and 152 of conductors 16 and 18 are connected, e.g. soldered, to the PCB 144 as shown in FIGS. 4 and 5. The conductors 16 and 18 then pass through the core of the transformer 20 and its sensor coil 22.

The thickness of the copper layer comprising destructible conductors 58 and 60 on the PCB 144 is preferably between 10 and 20 microns. The thickness of destructible conductors 58 and 60 is increased by approximately 5 microns by the addition of tin or other suitable galvanic overlay. The suitable galvanic overlay helps to prevent corrosion. However, the destructible conductors 58 and 60 are not coated with the insulating lacquer. The closest distance between destructible conductors 58 and 60 should be approximately 1 mm.

The plug housing may be comprised of two interfitting halves, bottom half 146 and top half 147. The plug pins 12 and 14 may be injection molded into the bottom half 146. If PCB 144 is riveted onto the plug pins 12 and 14, an electrical connection to conductors 58 and 60 is thereby formed.

Figure 6:
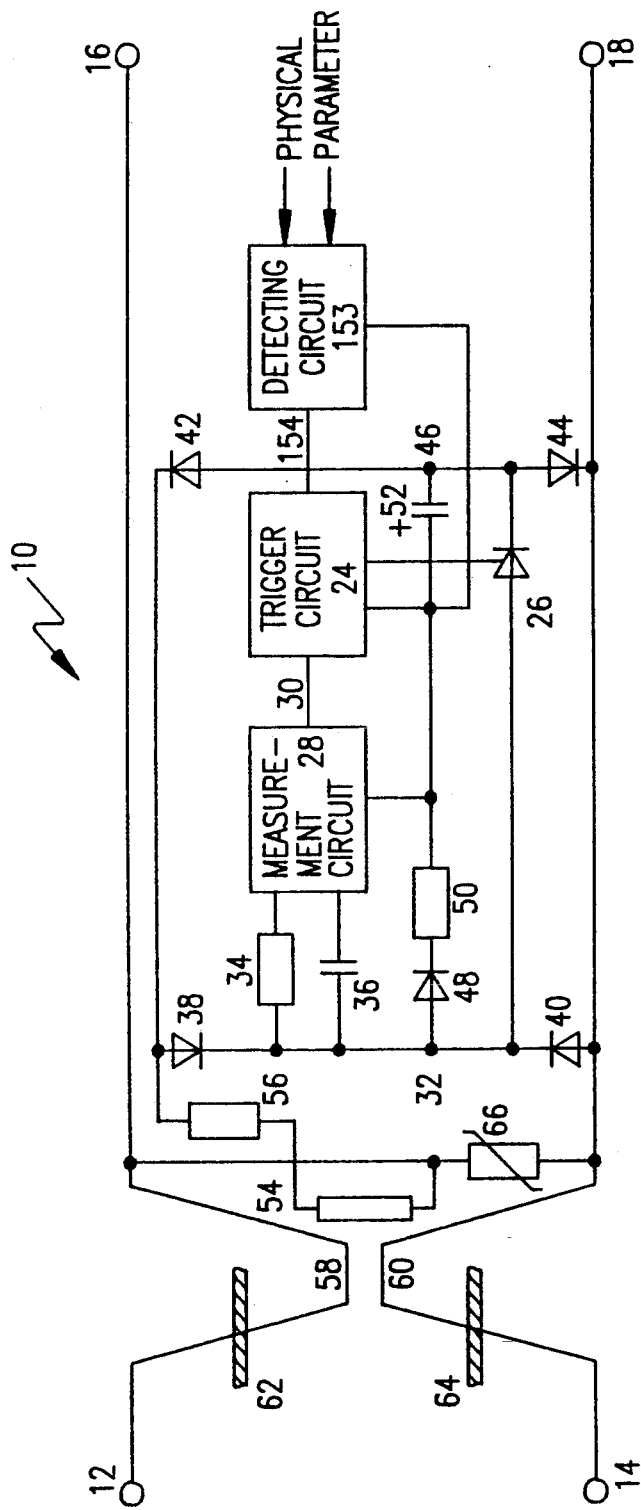
FIG. 6 is a schematic drawing of a typical circuit embodying the present invention for interruption of an electric circuit at selected levels of a physical parameter supplied by an appropriate conventional detection circuit which converts the physical parameter to electrical signals.

As illustrated in FIG. 6, a detecting circuit 153 can be substituted for the differential transformer 20 and sensor coil 22. Detection circuit 153 senses a physical parameter associated with the operation of the externally powered electrical apparatus such as temperature, pressure, speed, current, voltage or a combination thereof. When one or more of these parameters exceed a certain value, it is necessary to quickly terminate the flow of electric power to the device. Thus, when the physical parameter exceeds a certain preselected value, the detection circuit 153 sends an electrical signal via 154 to trigger circuit 24. Trigger circuit 24 and electric measurement circuit 28 both operate as described above. Detection circuit 153 is of any conventional design and is well known to those of ordinary skill in the art.

What is claimed is:

1. A current interruption device for an externally powered electrical apparatus comprising:
   a detection means for detecting a selected value of a physical parameter associated with the operation of the externally powered electrical apparatus and generating a detection signal in response to the detection of the selected value of the physical parameter;
   a trigger means electrically connected to the detection means that generates a firing signal in response to the detection signal;
   a silicon-controlled rectifier electrically connected to the trigger means that fires in response to the firing signal;
   a plasma generating means electrically connected to the silicon-controlled rectifier including a resistor responsive to the firing of the silicon-controlled rectifier; and
   a plurality of fuse means each electrically connected to one of a plurality of non-ground electrical conductors that carry electrical power to the externally powered electrical apparatus and to one of a plurality of electrical power input conductors, wherein each of the plurality of fuse means comprises a destructible conductor and wherein the firing of the silicon-controlled rectifier will cause the resistor to evaporate, creating a plasma that initiates an electric arcing between the plurality of fuse means, thereby interrupting current flow to the electrically powered apparatus.

2. The current interruption device according to claim 1 wherein the physical parameter associated with the operation of the externally powered electrical apparatus is a current differential between the non-ground electrical conductors which carry power to the externally powered electrical apparatus.

3. The current interruption device according to claim 2 wherein the detection means comprises a hollow core differential transformer through which the non-ground electrical conductors pass.

4. The current interruption device according to claim 3 wherein the current interruption device further comprises a printed circuit board.

5. The current interruption device according to claim 4 wherein the destructible conductors are formed from a copper layer on a surface of the printed circuit board.

6. The current interruption device according to claim 5 wherein the trigger means comprises an integrated circuit.

7. The current interruption device according to claim 5 wherein the copper layer is about 10 to about 20 microns thick.

8. The current interruption device according to claim 7 wherein the destructible conductors are overlaid with about 5 microns of galvanic overlay.

9. The current interruption device according to claim 6 further comprising barriers which stop the destruction of the conductors at a selected point.

10. The current interruption device according to claim 6 wherein the resistor is coated with an insulating lacquer.

11. The current interruption device according to claim 10 wherein the resistor is located on the printed circuit board between the destructible conductors.

12. The current interruption device according to claim 10 wherein the resistor generates the plasma within about 0.5 milliseconds of the firing of the silicon-controlled rectifier.

13. The current interruption device according to claim 9 wherein the destructible conductors are arranged in a V-shape on the surface of the printed circuit board.

14. The current interruption device according to claim 5 wherein the closest distance between destructible conductors is about 1 mm.

15. The current interruption device according to claim 1 further comprising an electric measurement means electrically connected to the trigger circuit and responsive to electrical conditions at a selected point to prevent the generation of the fire signal by the trigger means unless a predetermined condition at the selected point is sensed by the electric measurement means.

16. The current interruption device according to claim 15 wherein the predetermined condition is the voltage at the selected point exceeding of a threshold voltage.

17. The current interruption device according to claim 15 wherein the predetermined condition is the voltage at the selected point exceeding a threshold voltage while the derivative of the voltage at the selected point is positive.

18. The current interruption device according to claim 15 wherein the predetermined condition is the exceeding of a threshold voltage by the sum of the voltage at the selected point and the derivative of the voltage at the selected point.

19. The current interruption device according to claim 15 wherein the destructible conductors are destroyed within about 8.3 to about 10 milliseconds.

20. The current interruption device according to claim 15 further comprising a metal oxide varistor for preventing unnecessary firing due to power supply voltage spikes.

21. The current interruption device according to claim 15 wherein the physical parameter associated with the operation of the externally powered electrical apparatus is selected from the group consisting of temperature, pressure, speed and voltage.

22. A method for interrupting current flow to an externally powered electrical apparatus, using a plurality of destructible conductors and a resistor, comprising:
   detecting a selected value of a physical parameter associated with the operation of the externally powered electrical apparatus;
   signaling a trigger device to generate a firing signal upon detection of the selected value of the physical parameter;
   firing a silicon-controlled rectifier in response to the firing signal;
   evaporating a resistor in response to the firing of the silicon-controlled rectifier to create a plasma which initiates an electric arcing between the destructible conductors, causing them to be burned-off and destroyed.

23. The method of claim 22 wherein the signaling of the trigger device is inhibited unless the voltage measured at a selected point exceeds a selected voltage.

24. The method of claim 23 wherein the destructible conductors are fabricated from a 20 micron copper sheet on a surface of a printed circuit board.

25. The method according to claim 24 wherein the trigger means comprises an integrated circuit.

26. The method according to claim 22 wherein the physical parameter associated with the externally powered electrical apparatus is a current differential between the non-ground electrical conductors which carry power to the externally powered electrical apparatus.

27. The method according to claim 26 wherein the selected current differential is detected by a hollow core differential transformer through which the non-ground electrical conductors pass.

28. The method according to claim 22 wherein the physical parameter associated with the operation of the externally powered electrical apparatus is selected from the group consisting of temperature, pressure, speed and voltage.

29. A current interruption device for an externally powered electrical apparatus comprising:

a detection means for detecting a selected value of a physical parameter associated with the operation of the externally powered electrical apparatus and generating a detection signal in response to the detection of the selected value of the physical parameter;

a trigger means electrically connected to the detection means that generates a firing signal in response to the detection signal;

a silicon-controlled rectifier electrically connected to the trigger means that fires in response to the firing signal;

a plasma generating means electrically connected to the silicon-controlled rectifier responsive to the firing of the silicon-controlled rectifier; and a pair of fuse means each electrically connected to one of a pair of non-ground electrical conductors that carry electrical power to the externally powered electrical apparatus and to one of a pair of electrical power input conductors, wherein each of the pair of fuse means comprises a destructible conductor and wherein the firing of the silicon-controlled rectifier will activate the plasma generating means, creating a plasma that initiates an electric arcing between the pair of fuse means, thereby interrupting current flow to the electrically powered apparatus.

30. The current interruption device according to claim 29 further comprising an electric measurement means electrically connected to the trigger circuit and response to electrical conditions at a selected point to prevent the generation of the fire signal by the trigger means unless a predetermined condition at the selected point is sensed by the electric measurement means.

* * * * *